US008574178B2

(12) United States Patent
Tong et al.

(10) Patent No.: US 8,574,178 B2
(45) Date of Patent: Nov. 5, 2013

(54) WEARABLE POWER ASSISTIVE DEVICE FOR HELPING A USER TO MOVE THEIR HAND

(75) Inventors: Kai Yu Tong, Hong Kong (HK); Peter Man Kit Pang, Hong Kong (HK); Mo Chen, Hong Kong (HK); Sze Kit Ho, Hong Kong (HK); Hongfu Zhou, Hong Kong (HK); David Tai Wai Chan, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 1078 days.

(21) Appl. No.: 12/472,295

(22) Filed: May 26, 2009

(65) Prior Publication Data

US 2010/0305717 A1    Dec. 2, 2010

(51) Int. Cl.
*A61H 1/02*  (2006.01)

(52) U.S. Cl.
USPC .................................. 601/40; 601/5

(58) Field of Classification Search
USPC ................. 601/5, 23, 33, 40, 84; 623/57, 64; 482/47
See application file for complete search history.

(56) References Cited

U.S. PATENT DOCUMENTS

| 4,368,728 A |   | 1/1983  | Pasbrig |
|---|---|---|---|
| 4,644,938 A |   | 2/1987  | Yates et al. |
| 4,936,229 A |   | 6/1990  | Parnell |
| 5,328,448 A |   | 7/1994  | Gray, Sr. |
| 5,376,091 A |   | 12/1994 | Hotchkiss et al. |
| 5,466,213 A |   | 11/1995 | Hogan et al. |
| 5,683,351 A | * | 11/1997 | Kaiser et al. .................... 601/40 |
| 5,755,645 A |   | 5/1998  | Miller et al. |
| 5,830,160 A |   | 11/1998 | Reinkensmeyer |
| 6,500,094 B1 |   | 12/2002 | Lin |
| 6,502,577 B1 |   | 1/2003  | Bonutti |
| 6,613,000 B1 |   | 9/2003  | Reinkensmeyer et al. |
| 6,918,622 B2 |   | 7/2005  | Kim et al. |
| 7,222,904 B2 |   | 5/2007  | Matsuda |
| 7,289,884 B1 |   | 10/2007 | Takahashi et al. |
| 7,296,853 B2 |   | 11/2007 | Piretti |
| 7,370,896 B2 |   | 5/2008  | Anderson et al. |
| 7,445,260 B2 |   | 11/2008 | Nihei et al. |
| 2003/0073939 A1 | * | 4/2003 | Taylor et al. .................... 601/40 |
| 2006/0106326 A1 |   | 5/2006 | Krebs et al. |
| 2007/0276303 A1 |   | 11/2007 | Jenner, Jr. |

(Continued)

FOREIGN PATENT DOCUMENTS

| CN | 2103990 U | 5/1992 |
|---|---|---|
| CN | 2220256 Y | 2/1996 |

(Continued)

*Primary Examiner* — Quang D Thanh
(74) *Attorney, Agent, or Firm* — Muncy, Geissler, Olds & Lowe, PLLC

(57) ABSTRACT

A rehabilitation system for training hand movement of a user, the system comprising: a platform to be attached to the hand of the user; a plurality of finger assemblies operatively connected to the platform, each finger assembly having: a motor, a proximal follower assembly for a metacarpophalangeal (MCP) joint having a proximal rail guide operatively connected to the motor, and an intermediate follower assembly for a proximal interphalangeal (PIP) joint having an intermediate rail guide operatively connected to the proximal follower assembly; wherein a knuckle joint indicator of the proximal rail guide corresponds to a first virtual center and knuckle joint indicator of the intermediate rail guide corresponds to a second virtual center, the alignment of the knuckle joint indicators to the virtual centers enable motion of the finger to be controlled and maintain rotational axes of the finger about each virtual center when the proximal and intermediate follower assemblies are actuated by the motor.

16 Claims, 20 Drawing Sheets

(56) References Cited

U.S. PATENT DOCUMENTS

| | | | |
|---|---|---|---|
| 2010/0249675 A1* | 9/2010 | Fujimoto et al. | 601/40 |
| 2012/0059290 A1* | 3/2012 | Yip | 601/40 |

FOREIGN PATENT DOCUMENTS

| | | |
|---|---|---|
| CN | 1117839 A | 3/1996 |
| CN | 2301196 Y | 12/1998 |
| CN | 2367292 Y | 3/2000 |
| CN | 1480118 A | 3/2004 |
| CN | 1582866 A | 2/2005 |
| CN | 2707239 Y | 7/2005 |
| CN | 1861030 A | 11/2006 |
| CN | 101125112 A | 2/2008 |
| CN | 201033143 Y | 3/2008 |
| JP | 2007020617 A | 2/2007 |
| JP | 2008067852 A | 3/2008 |

* cited by examiner

Figure 9
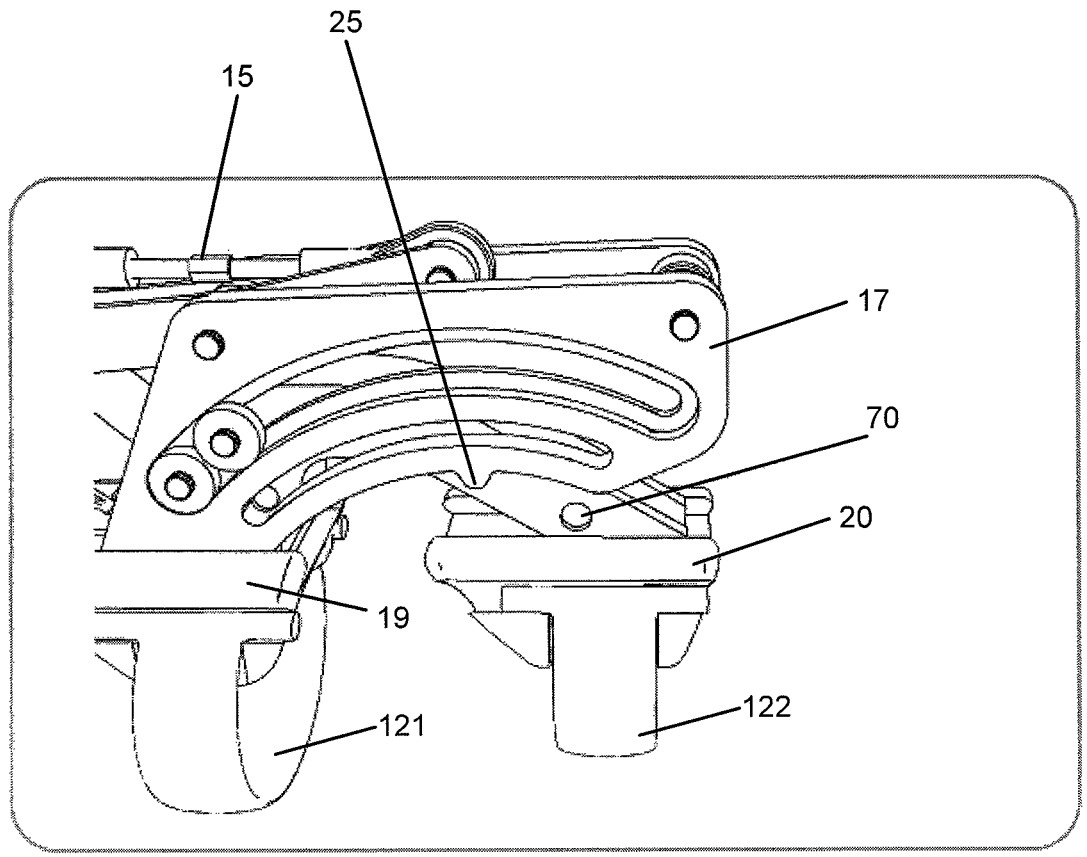
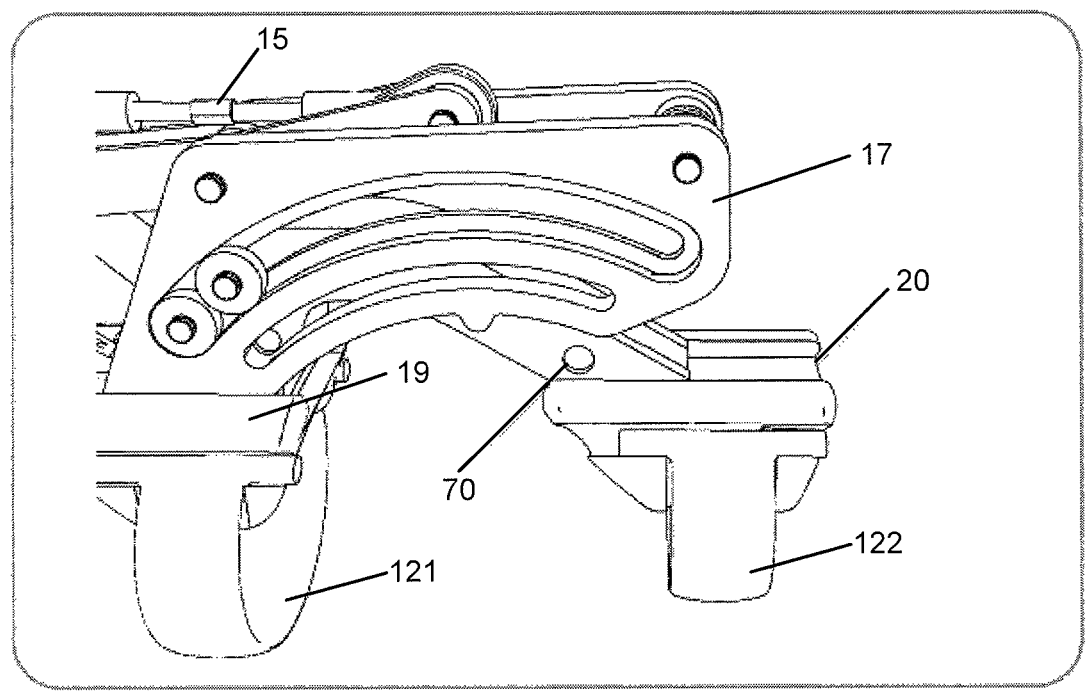

WEARABLE POWER ASSISTIVE DEVICE FOR HELPING A USER TO MOVE THEIR HAND

TECHNICAL FIELD

The invention concerns a wearable power assistive device for helping a user to move their hand and a rehabilitation system for training hand movement of a user.

BACKGROUND OF THE INVENTION

Traditional rehabilitation devices for training hand movement suffer from two problems. Firstly, the devices are not wearable and therefore do not allow the user to perform functional movement using their fingers which require rehabilitation. Secondly, users are trained with a pre-programmed training trajectory that the user has previously been trained on in a passive environment. These kinds of systems lack voluntary involvement for control of rehabilitative training.

SUMMARY OF THE INVENTION

In a first preferred aspect, there is provided a rehabilitation system for training hand movement of a user, the system comprising:
 a platform to be attached to the hand of the user;
 a plurality of finger assemblies operatively connected to the platform, each finger assembly having: a motor, a proximal follower assembly for a metacarpophalangeal (MCP) joint having a proximal rail guide operatively connected to the motor, and an intermediate follower assembly for a proximal interphalangeal (PIP) joint having an intermediate rail guide operatively connected to the proximal follower assembly;
 wherein a knuckle joint indicator of the proximal rail guide corresponds to a first virtual center and knuckle joint indicator of the intermediate rail guide corresponds to a second virtual center, the alignment of the knuckle joint indicators to the virtual centers enable motion of the finger to be controlled and maintain rotational axes of the finger about each virtual center when the proximal and intermediate follower assemblies are actuated by the motor.

Each finger assembly may comprise a distal assembly for a distal interphalangeal (DIP) joint having a distal rail guide, and a knuckle joint indicator of the distal rail guide corresponds to a third virtual center.

The first virtual center may be located at the MCP joint, the second virtual center may be located at the PIP joint and the third virtual center may be located at the DIP joint.

There may be five finger assemblies operatively connected to the platform via five finger assembly sockets provided on the platform.

Each finger assembly may comprise a proximal support cushion and an intermediate support cushion and a distal support cushion for holding a finger.

The finger assembly socket, intermediate rail guide, proximal and intermediate follower assemblies and proximal and intermediate support cushions may be are connected using a dovetailed groove system.

The intermediate follower assembly has an adjustable linkage, the adjustable linkage and the dovetail groove system at the proximal follower and intermediate rail guide may correspond to alignment of the knuckle joint indicator to the second virtual center.

The positions of the virtual centers may be adjustable to accommodate different finger lengths, the first virtual center is adjusted by moving the position of the finger assembly in the finger assembly sockets to align with the center of the MCP joint, the second virtual center is adjusted by moving the adjustable linkage and a support lock in the dovetail system to align with the center of the PIP joint.

The proximal and intermediate support cushions may each have a ring for receiving a finger therethrough, and the position of the rings are adjustable to align the MCP joint and the PIP joint to maintain the rotational axes of the finger about each virtual center when the proximal and intermediate follower assemblies are actuated by the motor.

The rings may be releasably detachable from the dovetailed groove system.

The system may further comprise a sensor attached to the finger assembly to measure a feedback force applied by a finger and curvature position of the finger.

The system may further comprise a hand calibration software module to automatically determine a range of motion during hand opening and hand grasp functions.

The system may further comprise a motor control software module to automatically adjust all motors speed such that the motion of the fingers starts and finishes at the same time.

The system may further comprise a self adaptive motor speed adjustment module to automatically adjust the speed of each motor to accommodate the speed change, which due to the external force applied by the finger, during training in order to start and complete the full range of motion at the same time in the next finger motion.

The motor may be a linear actuator.

In a second aspect, there is provided a method for modifying a rehabilitation device to fit a hand of the user, the method comprising:
 aligning a first knuckle joint indicator of a proximal rail guide of the device to a first virtual center; and
 aligning a second knuckle joint indicator of an intermediate rail guide of the device to a second virtual center;
 wherein the alignment of the knuckle joint indicators to the virtual centers enable motion of the finger to be controlled and maintain rotational axes of the finger about each virtual center when the proximal and intermediate follower assemblies are actuated by the motor and maintain rotational axes of the finger about each virtual center.

In a third aspect, there is provided a finger assembly for training hand movement of a user, the finger assembly being operatively connected to a platform, the finger assembly comprising:
 a motor;
 a proximal follower assembly for a metacarpophalangeal (MCP) joint having a proximal rail guide operatively connected to the motor; and
 an intermediate follower assembly for a proximal interphalangeal (PIP) joint having an intermediate rail guide operatively connected to the proximal follower assembly;
 wherein a knuckle joint indicator of the proximal rail guide corresponds to a first virtual center and knuckle joint indicator of the intermediate rail guide corresponds to a second virtual center, the alignment of the knuckle joint indicators to the virtual centers enable motion of the finger to be controlled and maintain rotational axes of the finger about each virtual center when the proximal and intermediate follower assemblies are actuated by the motor.

The motor may be a linear actuator.

In a fourth aspect, there is provided a method for adjusting the speed of motors of a rehabilitation device for training hand movement of a user, each motor being used to move a finger along a predetermined trajectory, the method comprising:

a hand calibration software module to measure the range of motion of each finger based on force feedback applied by each finger;

a control software module to adjust the speed of each motor after a trial;

wherein the control software module calculates the individual speed of each motor in order to move all fingers between a maximum hand open position and a maximum hand closed position such that all the fingers complete the predetermined trajectory at the same time; and the control software module records the time to complete the predetermined trajectory for each trial to adjust the speed of all motors for a subsequent trial if the time is not equal to a predetermined time period.

The speed of the motor may be adjusted for every trial in response to a variation of an external force applied by the fingers of the user.

In a fifth aspect, there is provided a method for training hand movement of a user using rehabilitation device, the method comprising:

displaying a user interface to the user, the user interface displaying a set of target sliders for the user to track with their fingers;

detecting movement of each finger in response to movement of the target sliders; and displaying the position of each finger on the user interface;

wherein the target sliders are moved from 0% to 100% in a predetermined amount of time.

The position of the fingers may be represented as control sliders.

The rehabilitation system is a wearable power assistive device for helping a user to move their hand.

BRIEF DESCRIPTION OF THE DRAWINGS

An example of the invention will now be described with reference to the accompanying drawings, in which:

FIG. 9 is a side view of a third step for adjusting a finger assembly;

DETAILED DESCRIPTION OF THE DRAWINGS

Referring to FIGS. 1 to 15, a rehabilitation device 10 is provided that is driven by electromyography (EMG) of an affected limb of a user and therefore is interactively controlled by the user. Suitable users include the elderly and people with an upper-limb motor disability and stroke patients. EMG signals from affected muscles of the limb correspond to the user's intention and can control the assistive motion provided by the device 10. This enables the user to actively participate in a motor-relearn exercise in contrast to previous systems which only offer passive training. The device 10 focuses on upper-limb training by motorising and mechanically assisting the movement of the user's fingers. Movement includes primitive hand functions such as palmar grasp, pinch and hand opening.

Figure 14:
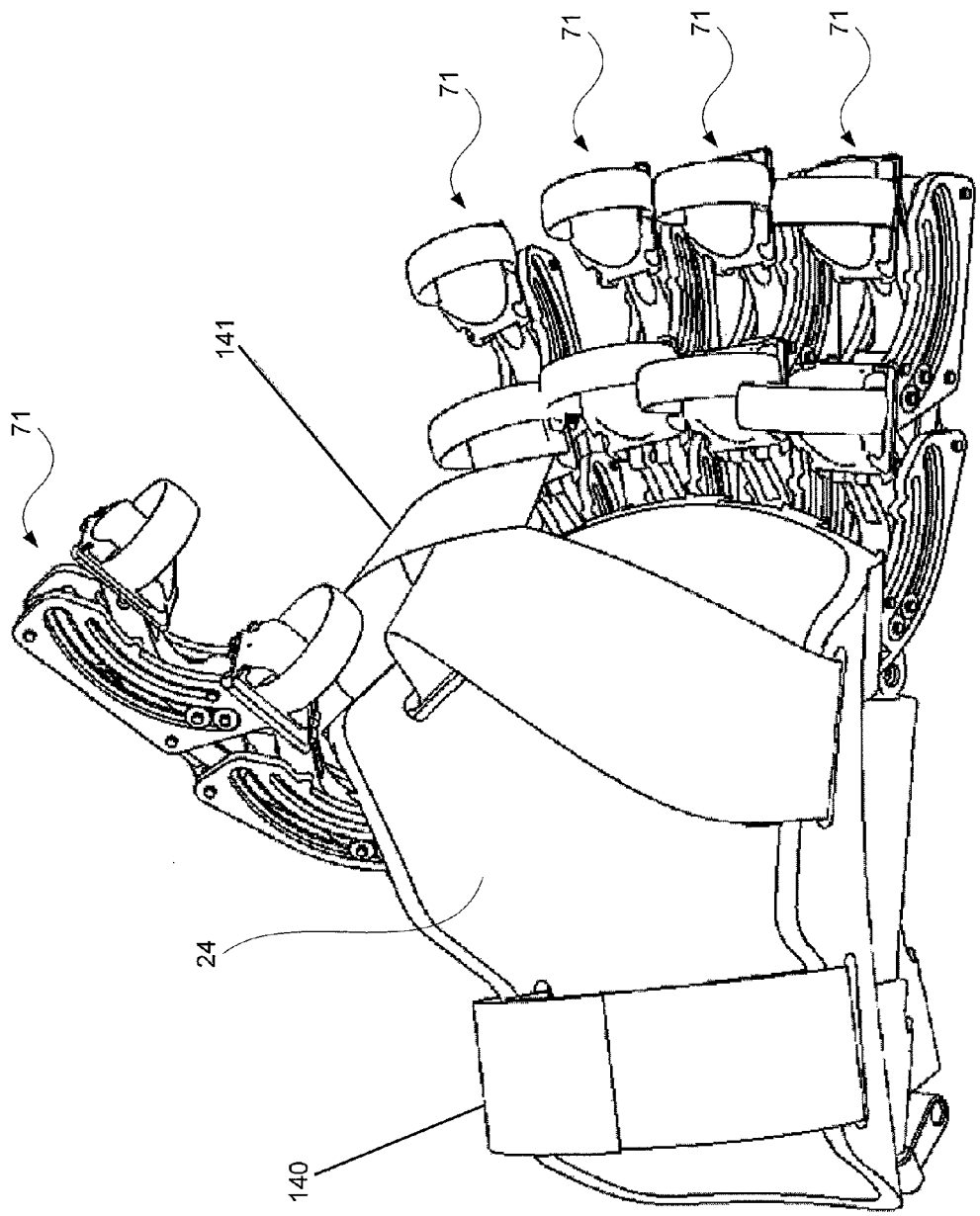
FIG. 14 is a bottom view of the device of FIG. 1 when worn to show a wristband and palmband.

The device 10 is built using a modular design and is compact in size. Turning to FIG. 14, there are five finger assemblies 71 operatively connected to a fixation platform 24 via finger assembly sockets 23 and set screws 70. The platform 24 is able to fit various palm sizes and requires only minor adjustment by tightening or loosening the wristband 140 and palmband 141. The platform 24 is able to change its shape and the position of the finger assembly socket 23 for various hand function tasks. The device 10 enables controlled and proportioned angular rotation in a restricted range for both metacarpophalangeal (MCP) and proximal interphalangeal (PIP) joints at the same time. The movement and responsiveness of the device 10 mimics the cohesive movement of the human finger specifically for hand opening and hand grasping actions.

The finger assemblies 71 are linearly actuated. A motor rear support 11 connects motors of the finger assemblies 71 to the platform 24. Each motor 12 is connected to a proximal follower assembly 13 for the MCP joint. The motor 12 may be a 50 mm ranged linear motor. The proximal follower assembly 13 is connected to the intermediate follower assembly 16 for the PIP joint. The intermediate follower assembly 16 is part of a linkage assembly 120. In another embodiment, a third assembly is fitted to motorize the distal interphalangeal (DIP) joint for motion of the finger tip.

The proximal follower assembly 13 has a proximal rail guide 14. The proximal rail guide 14 has a rotational range, for example, 55°. The knuckle joint indicator 22 of the proximal follower assembly 13 identifies the location of a first virtual center 30. The intermediate follower assembly 16 has an intermediate rail guide 17. The intermediate rail guide 17 has a rotational range, for example, 65°. The knuckle joint indicator 25 of the intermediate follower assembly 16 identifies the location of a second virtual center 31. The knuckle joint indicators 22, 25 are used as a visual reference point for the user to align their respective knuckle to the knuckle joint indicators 22, 25 of the device 10. In the rail guides 14, 17, bearings 32, 33 enable movement of the follower assemblies 13, 16 to follow the path of the rail guides 14, 17, for example when the proximal rail guide 14 moves to the 0° position, the intermediate rail guide 17 follows and moves to the 0° position. When the proximal rail guide 14 moves to the position of maximum range 55°, the intermediate rail guide 17 follow and moves to maximum range 65°, the assemblies 13, 16 generate a proportional relationship between the proximal and intermediate rail guides 14, 17. An angle amplifying linkage system is provided where the resulting angular motion of the intermediate follower assembly 16 is at a proportional ratio to the angular motion made by the proximal follower assembly 13.

Figure 7:
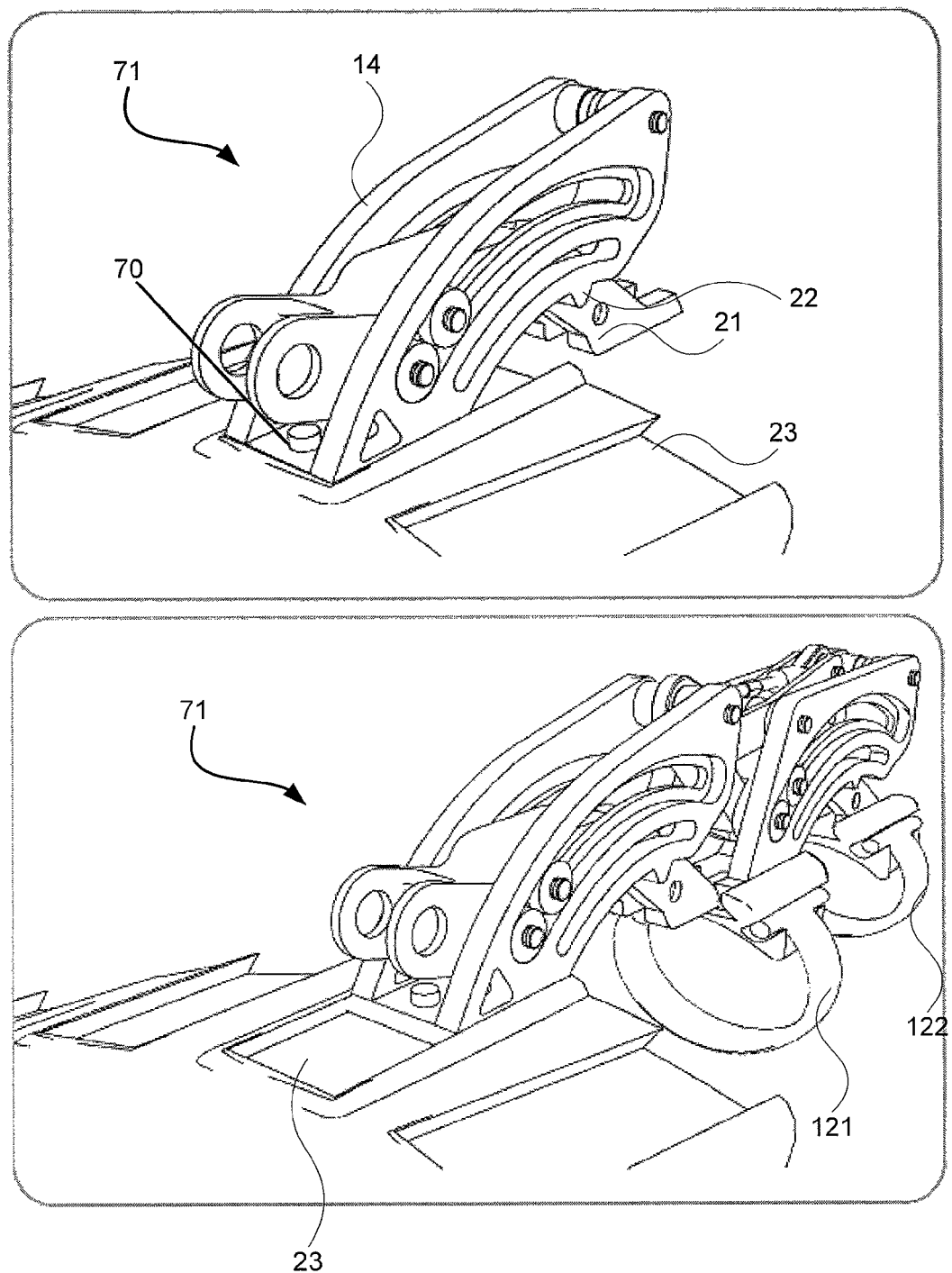
FIG. 7 is a perspective view of a first step for adjusting the finger assembly.
Figure 8:
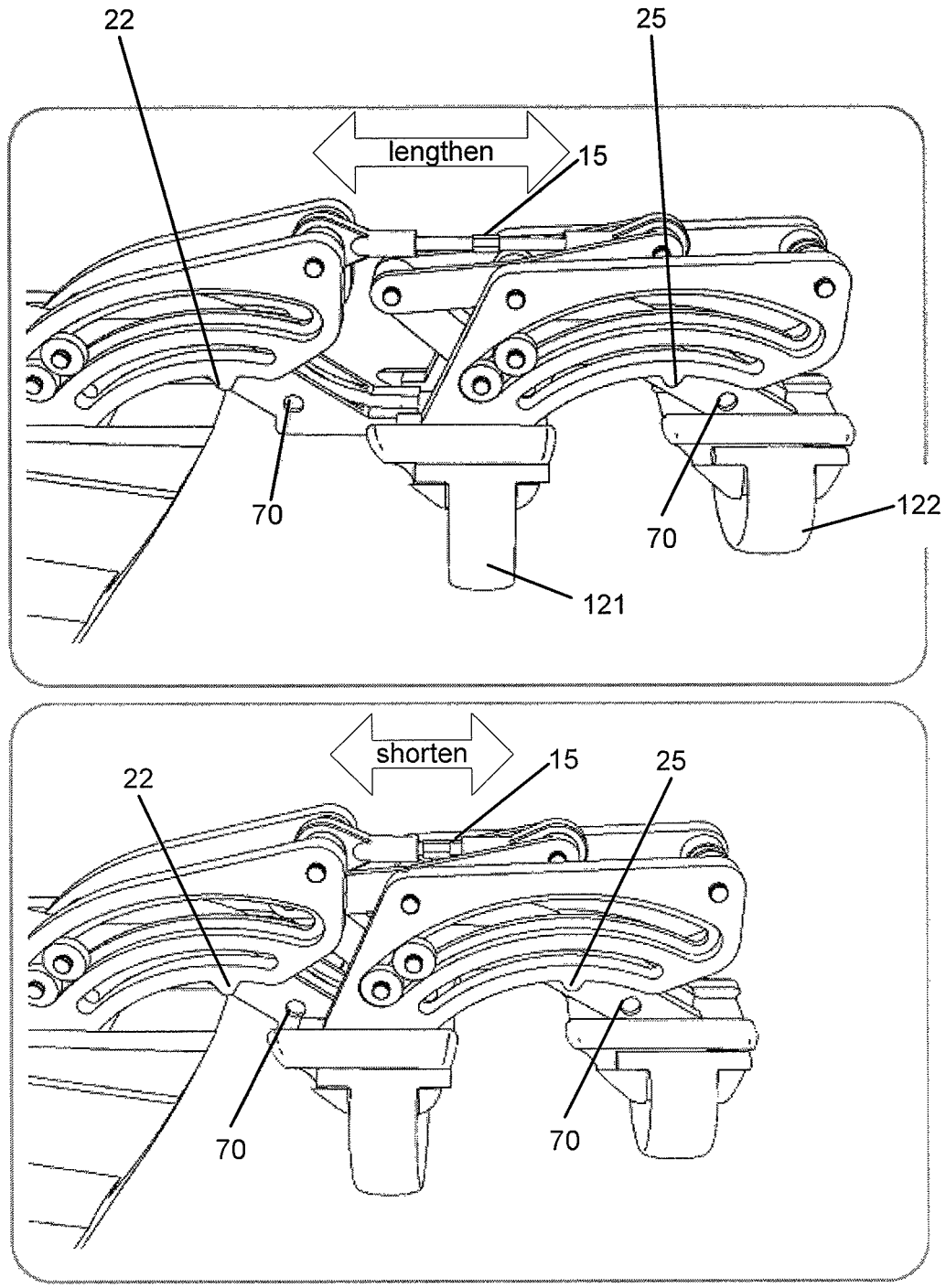
FIG. 8 is a side view of a second step for adjusting a finger assembly.
Figure 10:
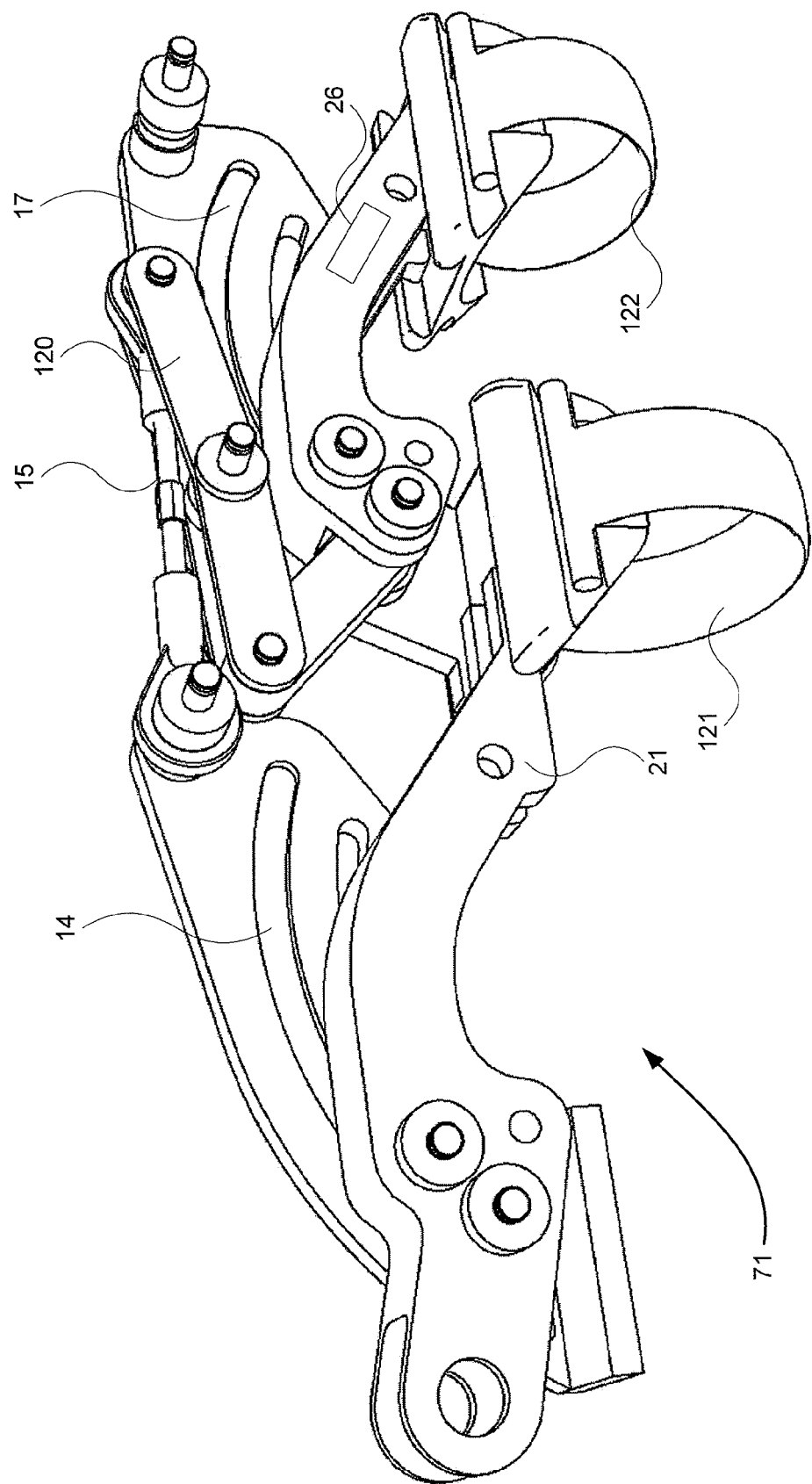
FIG. 10 is a perspective view of the finger assembly in an open position.
Figure 11:
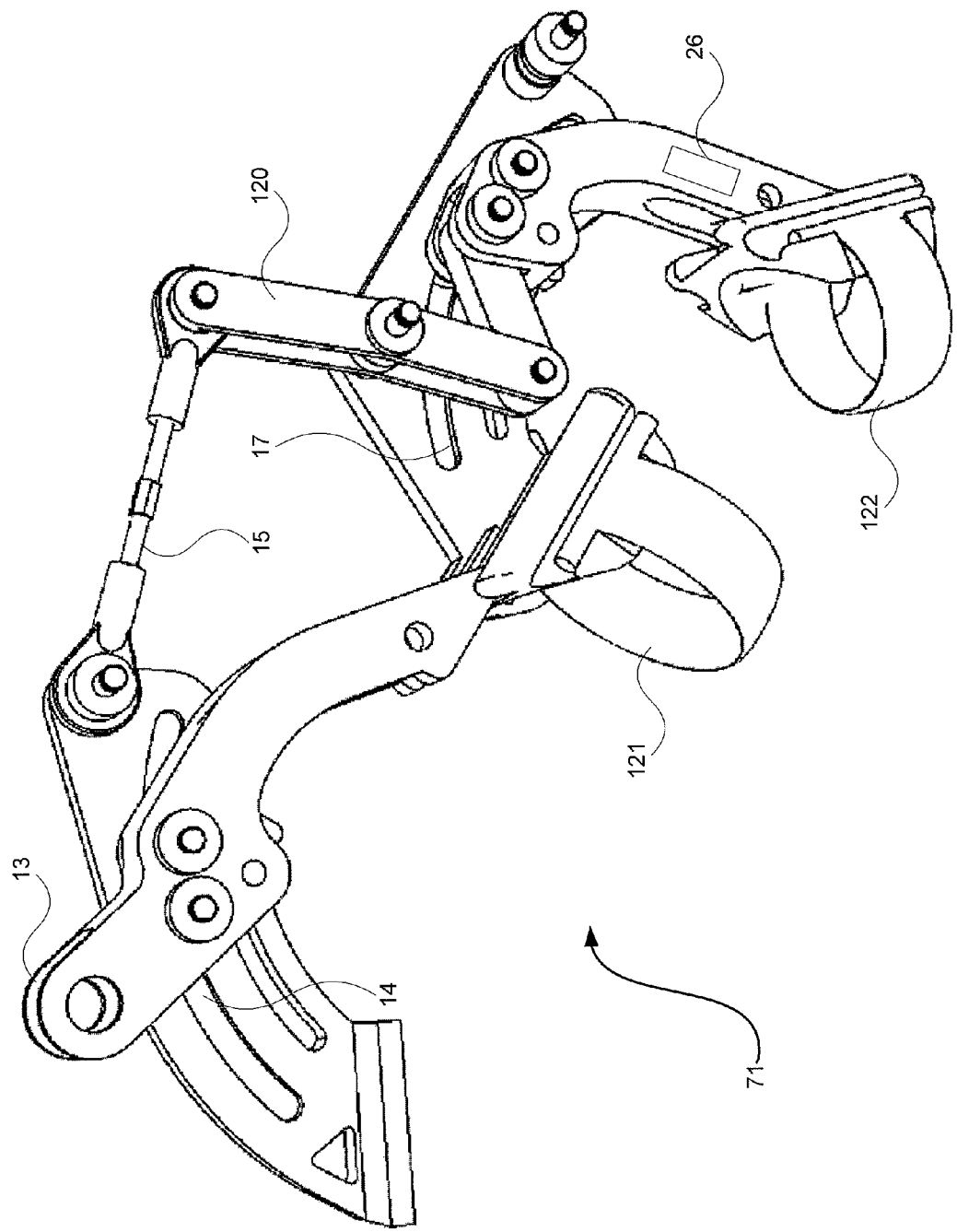
FIG. 11 is a perspective view of the finger assembly in a half-closed position.

Referring to FIGS. 7 and 8 the alignment of the knuckle joint indicators 22, 25 to the virtual centers 30, 31 enable motion of the finger to be controlled and maintain rotational axes of the finger about each virtual center 30, 31. To ensure that the knuckle joint indicators 22, 25 are in the correct position, a dovetailed groove system is used for the finger assembly socket 23. An inner dovetailed groove system 21, located on the proximal follower assembly 13 is used to engage the intermediate rail guide 17 to enable alignment of the intermediate rail guide 17 with the second virtual center 31. As the distance between the proximal and intermediate rail guides 14, 17 changes, the correct alignment of the linkage assembly 120 is adjustable to its origin by rotating the adjustable linkage 15. This restores its range of motion. The intermediate follower assembly 16 has a dovetail groove system 18 that provides adjustability for the intermediate support cushion 20 to align with the proximal interphalangeal joint of the finger.

Figure 12:
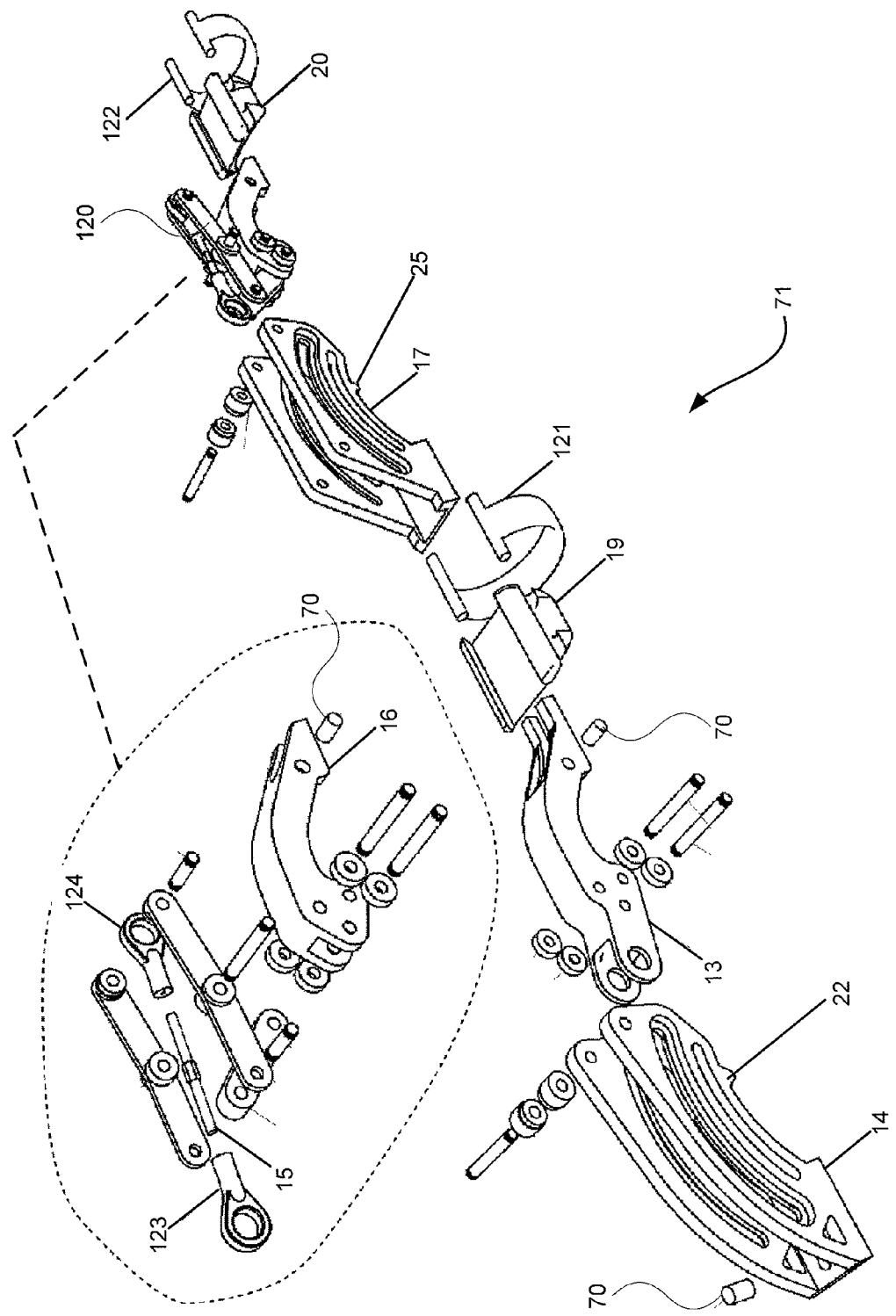
FIG. 12 is an exploded view of parts of the finger assembly.

Turning to FIG. 12, an exploded view of the parts of the finger assembly 71 is depicted. When the motor 12 is actuated, the longitudinal motion of the motor 12 is translated into angular/rotational motion causing relative rotation of the intermediate follower assembly 16 which follows the path of the intermediate rail guide 17 at the virtual centre 30 of the motion of the proximal follower assembly 13. One end 123 of the adjustable linkage 15 is connected to the proximal rail guide 14 while the other end 124 is connected to the intermediate follower assembly 16.

Referring to FIG. 6 to 11, the rotation of the intermediate rail guide 17 pulls the connecting end of the intermediate follower assembly 16 towards the proximal rail guide 14 which rotates through its own axis located at the intermediate rail guide 17.

An adjustable linkage 15 connects the intermediate follower assembly 16 to the linkage assembly 120. When the adjustable linkage 15 is moved, the rotational force of the linkage assembly 120 pushes the intermediate follower assembly 16 along the intermediate rail guide 17 to generate a second set of rotational motion centered at the second virtual center 31. The movement is reversible. A sensor 26 is attached to the intermediate follower assembly 16. The sensor 26 obtains a force feedback signal. In another embodiment, a second sensor 26 is fitted to the proximal follower assembly 13 for retrieving force feedback signal from both metacarpophalangeal (MCP) and proximal interphalangeal (PIP) joints at the same time.

Figure 1:
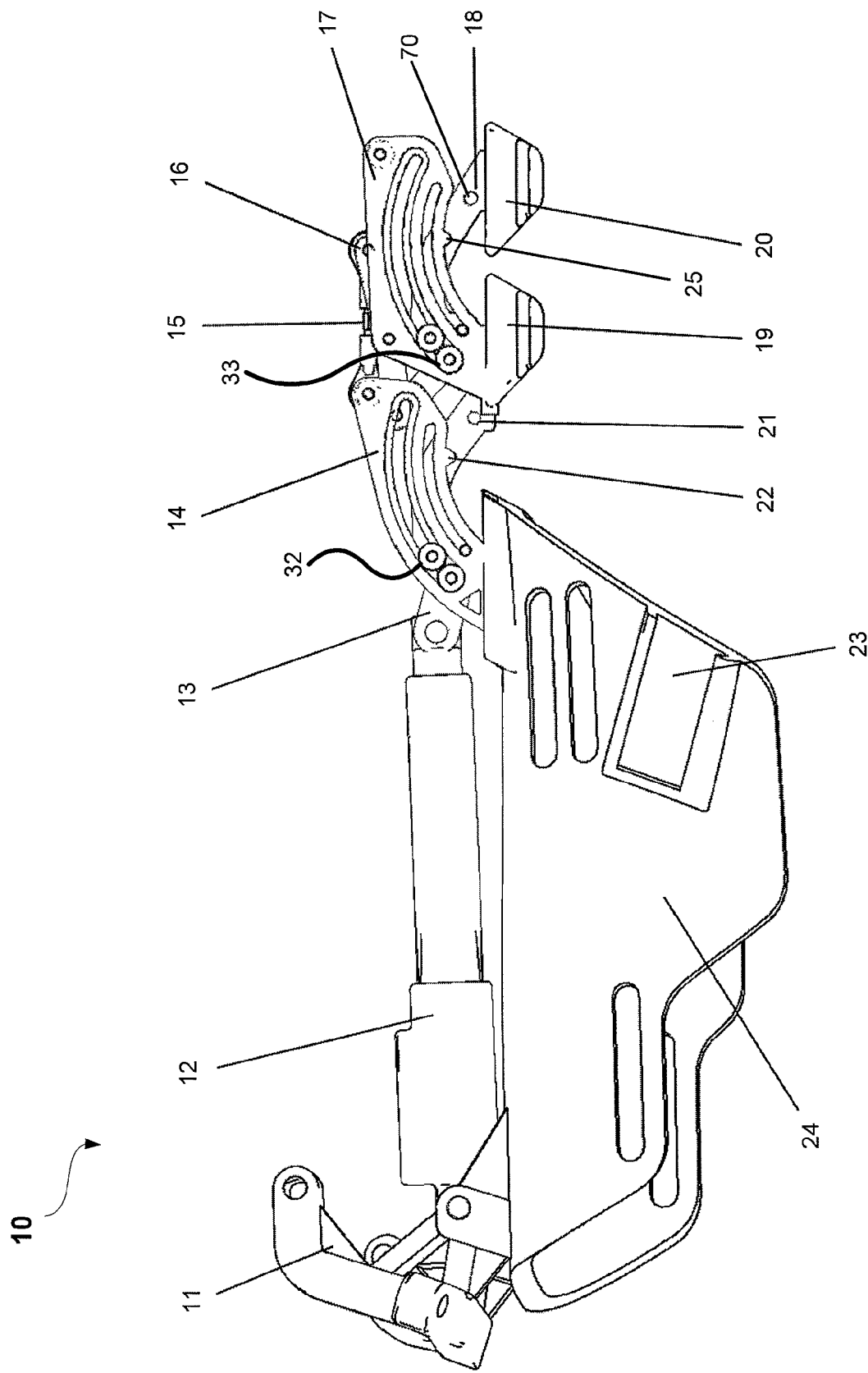
FIG. 1 is a side view of a rehabilitation device in accordance with a preferred embodiment of the present invention.
Figure 2:
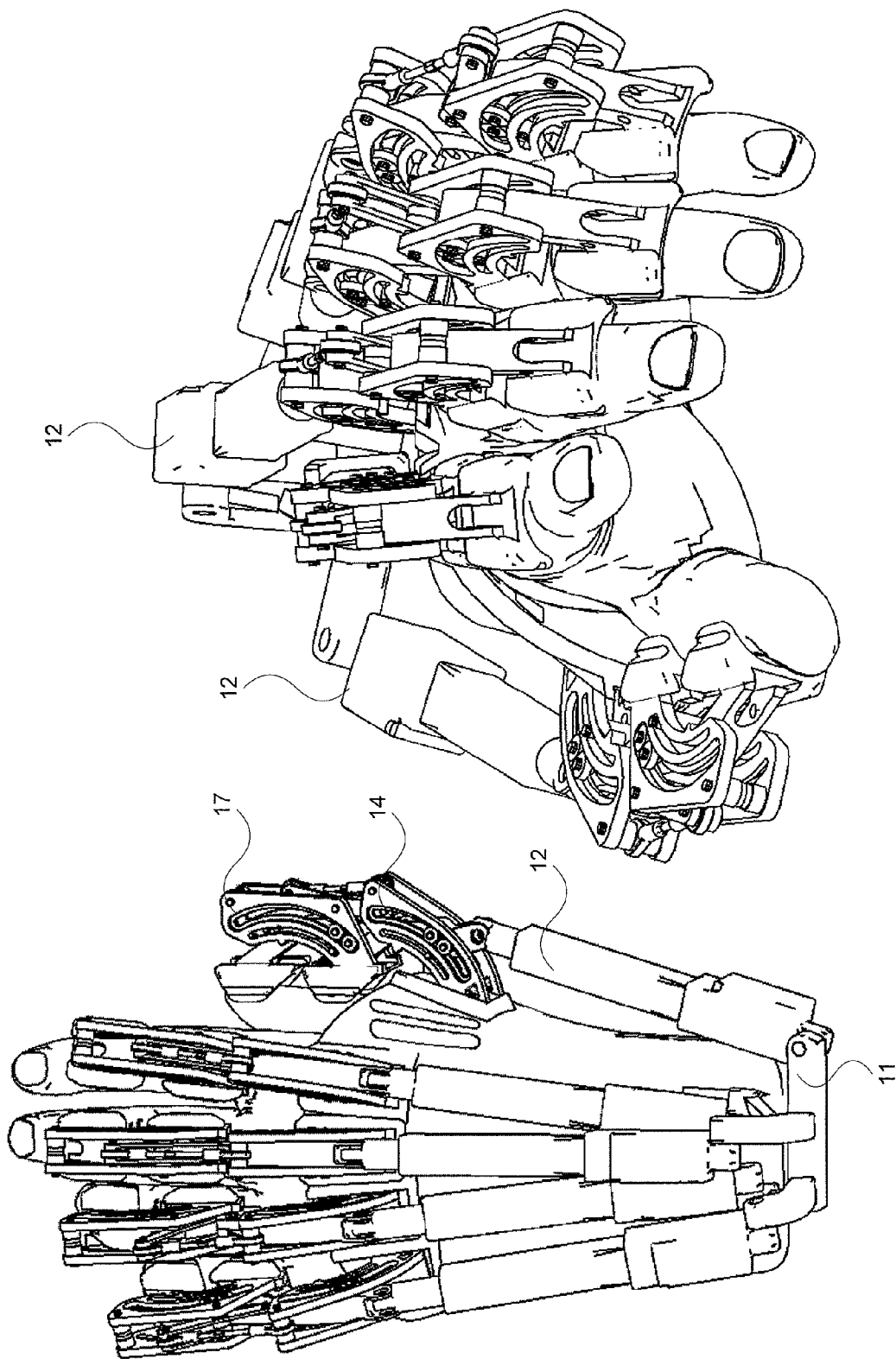
FIG. 2 is a top and front view of the device of FIG. 1 when it is worn.
Figure 3:
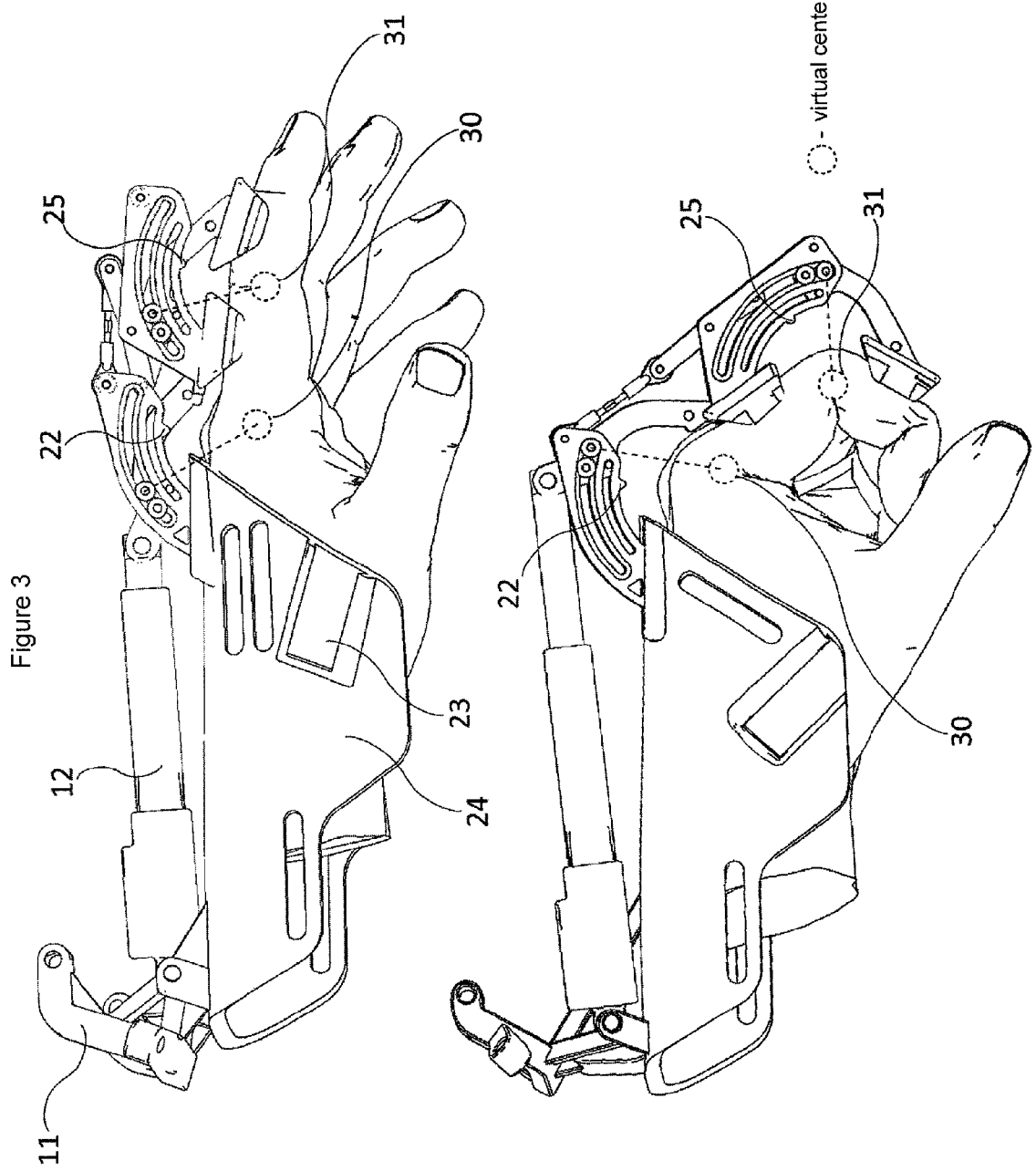
FIG. 3 is a side view of the device of FIG. 1 indicating the locations of virtual centers when the hand is at an open position and at a closed position.
Figure 13:
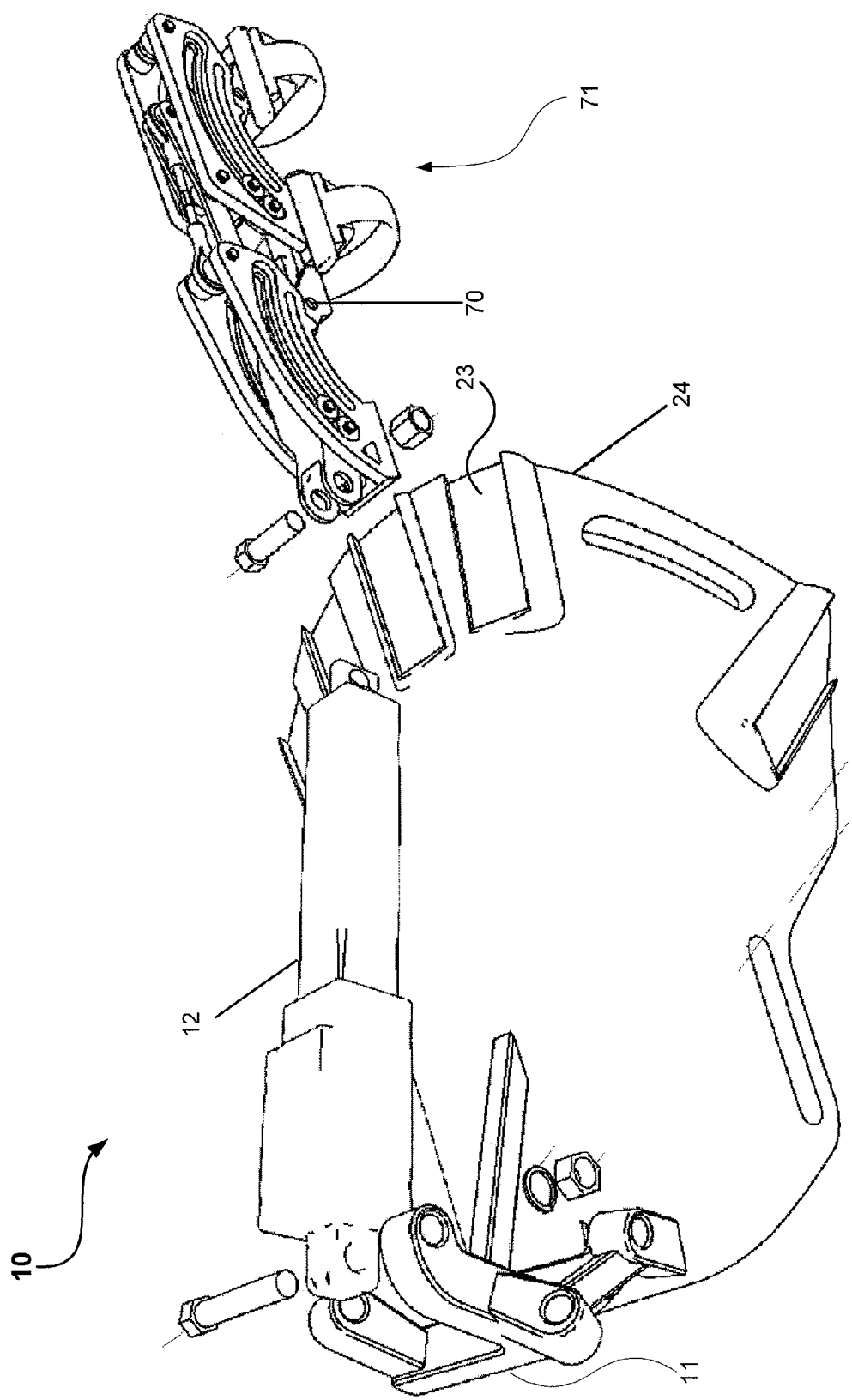
FIG. 13 is a perspective view of attaching the finger assembly to a fixation platform of the device of FIG. 1.

Turning to FIG. 2, every device 10 has, for example, five sets of the same finger assembly 71. This ensures rapid and cost effective manufacture since there is no need to produce five different finger assemblies. Attachment of the finger assemblies 71 to the fixation platform 24 is also fast as depicted in FIG. 13. The finger assembly 71 is slid into a finger assembly socket 23 of the fixation platform 24 and a bolt is fastened through holes in the proximal follower assembly 13 and the motor 12 pivotally connecting them together.

Figure 4:
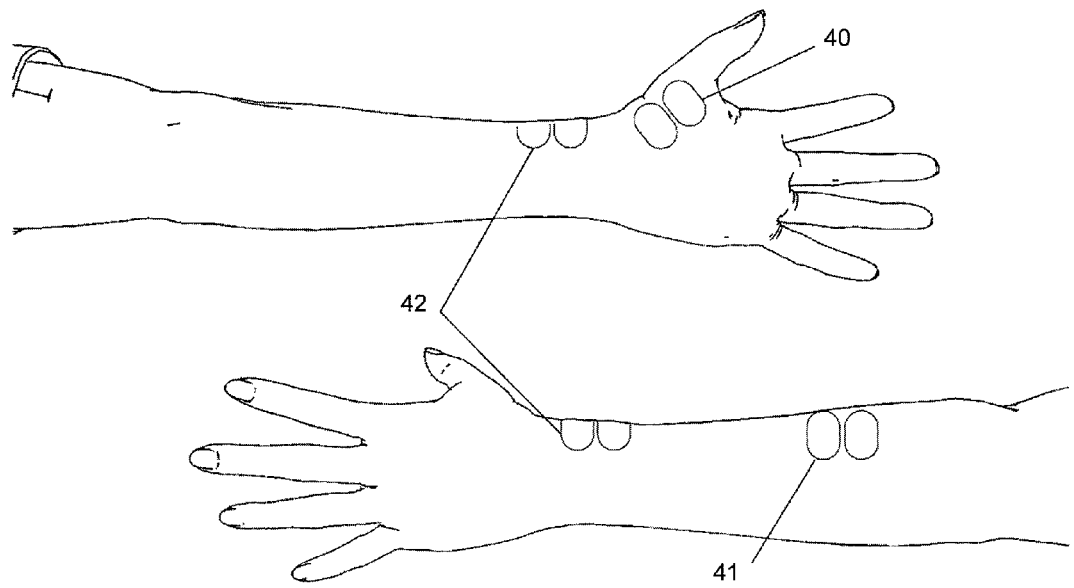
FIG. 4 is a top and bottom view of a hand showing placement of electrodes at abductor pollicis brevis (APB) muscle and extensor digitorum (ED) muscle for detecting EMG signals before the device of FIG. 1 is worn.
Figure 5:
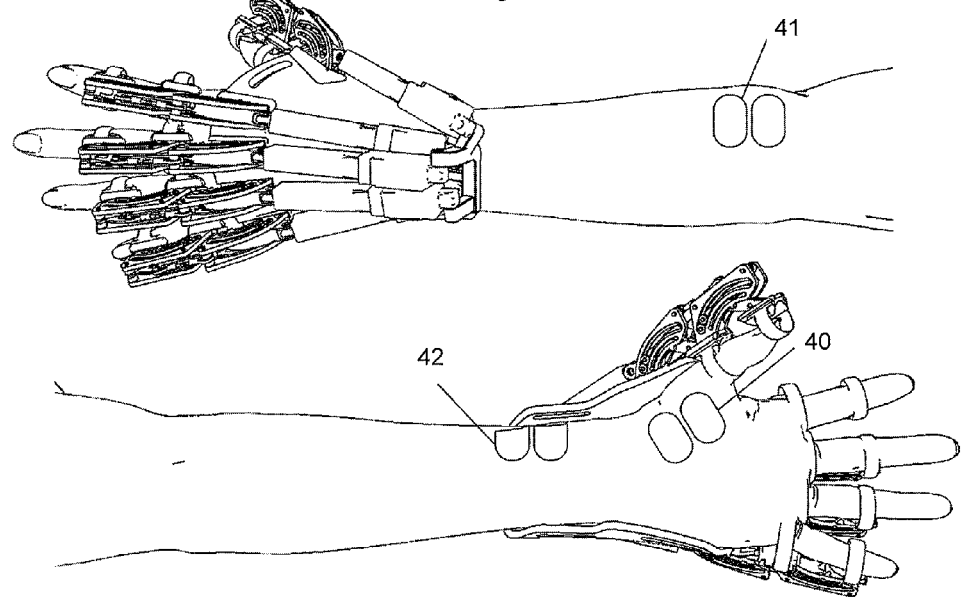
FIG. 5 is a top and bottom view of a hand showing placement of electrodes at abductor pollicis brevis (APB) muscle and extensor digitorum (ED) muscle for detecting EMG signals when the device is worn.
Figure 6:
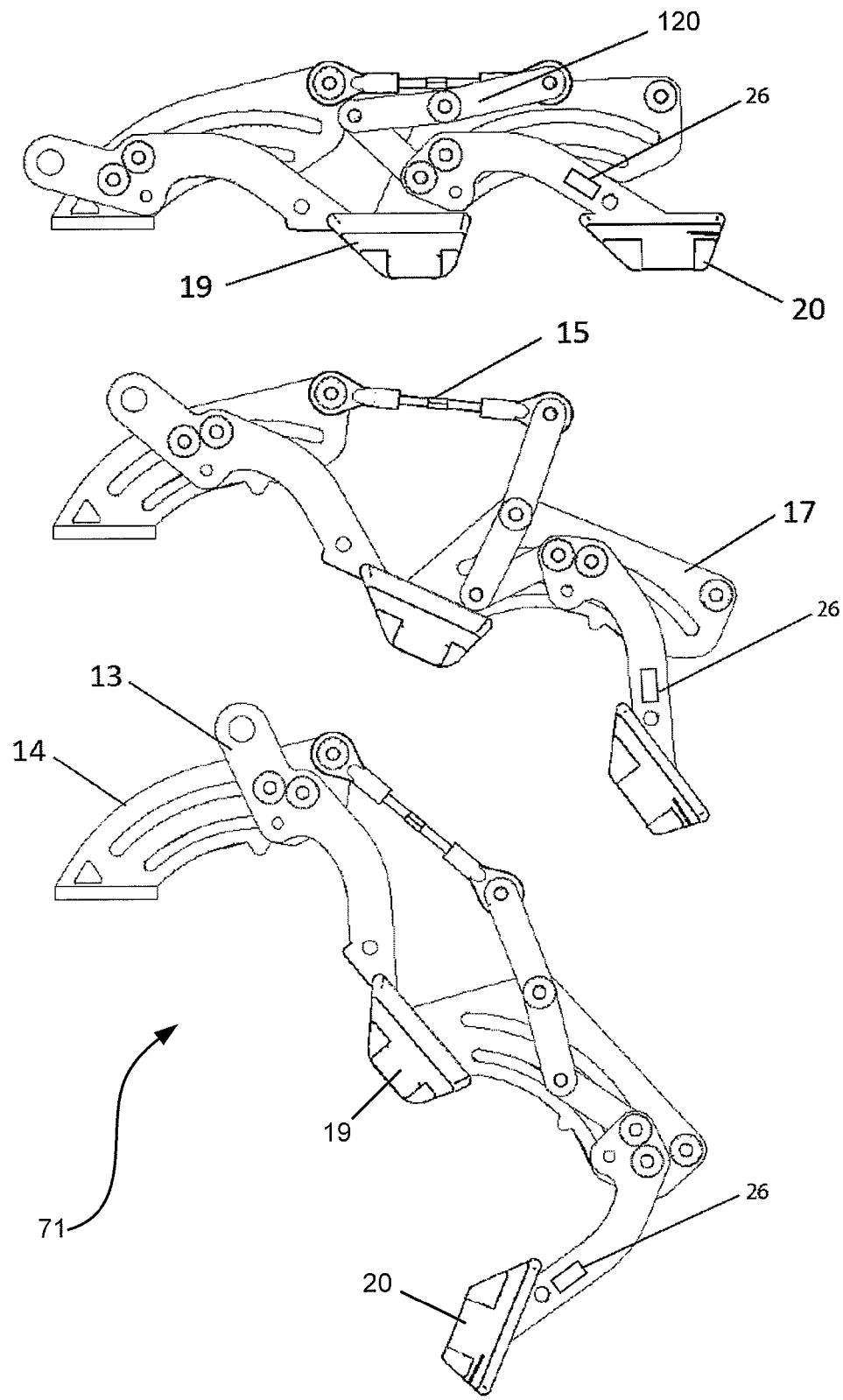
FIG. 6 is a side view of the action of the linkage system of a finger assembly when the motor of the device of FIG. 1 is pushed forward, showing that the two joints move at the same time for the flexion movement.

Turning to FIGS. 4 and 5, placement of the electrodes for detection of EMG signals from affected muscles of the limb is illustrated. Electrodes 40, 41 are placed on the abductor pollicis brevis (APB) muscle and extensor digitorum (ED) muscle. Reference electrodes 42 are also placed on the limb.

Turning to FIGS. 7 to 9, a finger is held within the rings 121, 122 of finger assemblies 71. The rings 121, 122 are connected to the proximal and intermediate support cushions 19, 20, respectively. There are, for example, two different sizes for the rings 121, 122. As the each finger assembly 71 is actuated by its motor 12, this causes the finger held in the rings 121, 122 to move also.

Turning to FIG. 13, the dovetailed groove system is used for the finger assembly socket 23, intermediate rail guide 17, both proximal and intermediate follower assemblies 13, 16 and proximal and intermediate support cushions 19, 20. This groove system allows the device 10 to be adjusted longitudinally along the length of the finger for various finger lengths.

Figure 15:
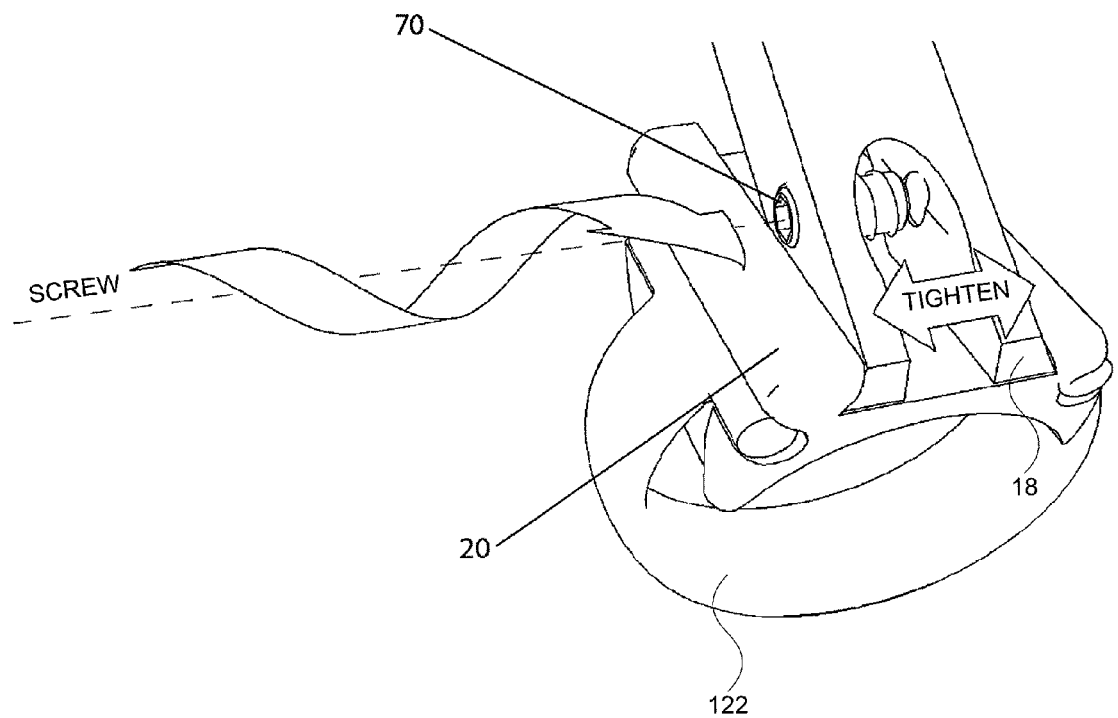
FIG. 15 is a perspective view illustrating a dovetailed groove system for the finger assembly.

Turning to FIG. 15, to secure the position after the adjustment of the follower assemblies 13, 16 is completed, set screws 70 are fastened into the holes located on the open end sparrow tailed extender of the dovetail groove systems 18, 21, located at the ends of both follower assemblies 13, 16.

Figure 16:
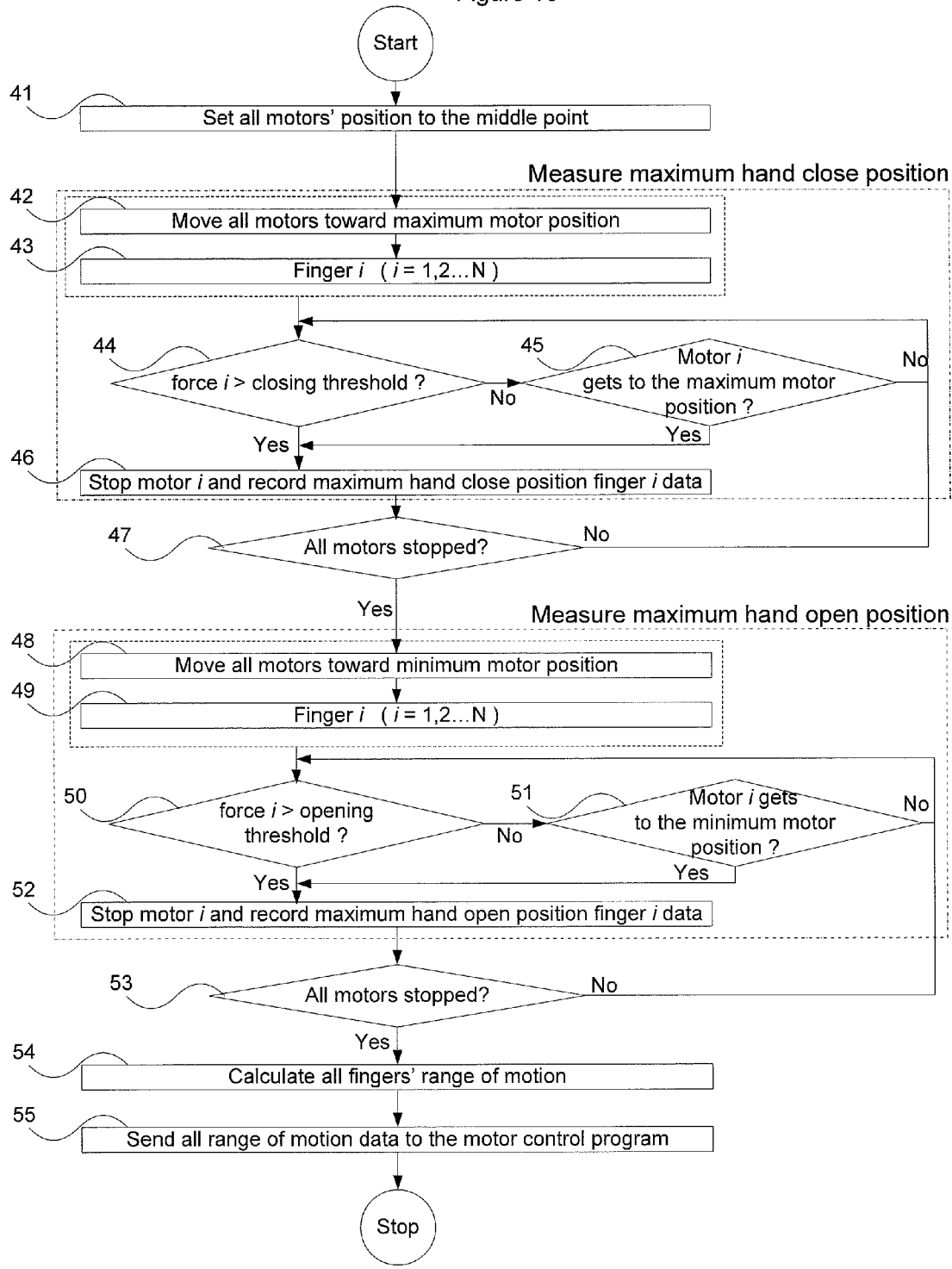
FIG. 16 is a process flow diagram of automatically measuring the range of motion of all fingers using force feedback.
Figure 17:
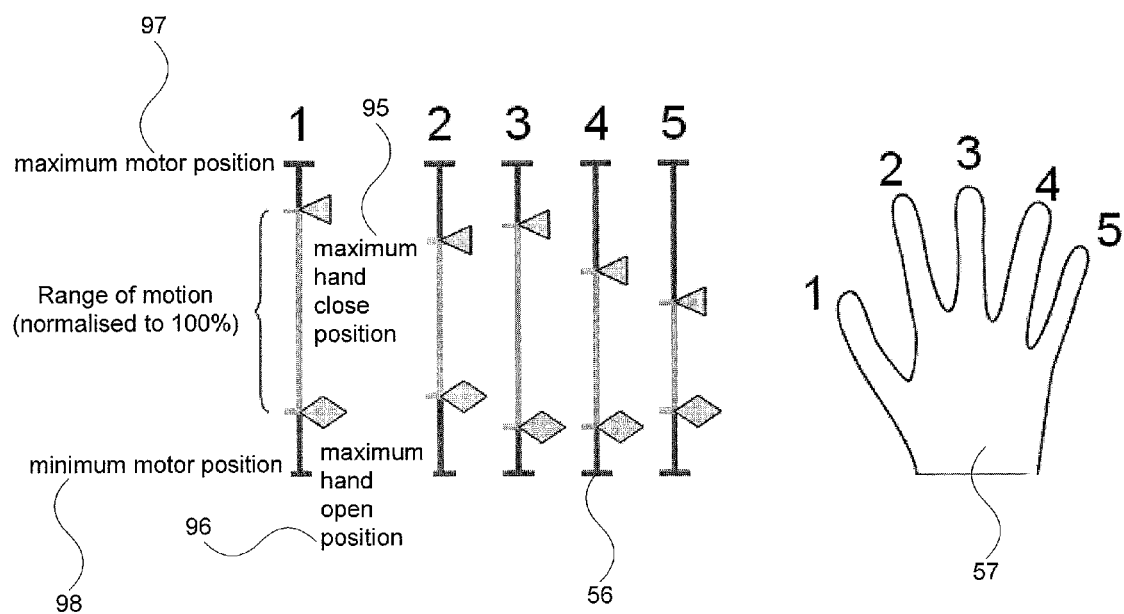
FIG. 17 is a screenshot from a software calibration program for automatic hand size calibration.
Figure 18:
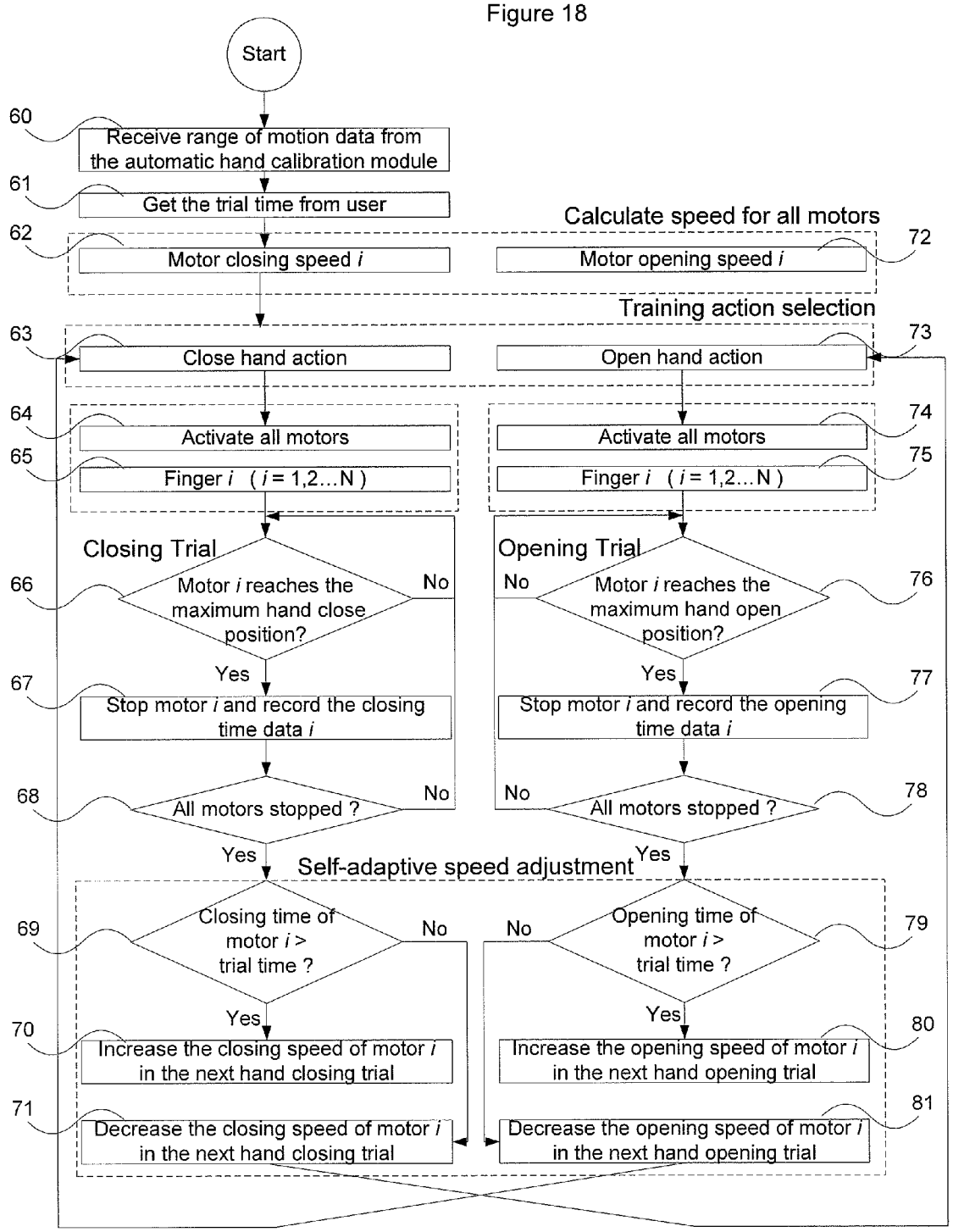
FIG. 18 is a process flow diagram for controlling and automatically adjusting the speed of all the motors to finish finger movement at the same time.

Referring to FIGS. 16 to 18, a software program is provided for automatic hand calibration of the device 10 for measurement of the range of motion and the motor control for hand opening and hand grasp functions. Each finger or thumb of a hand 57 may have a different range of motion between hand opening and hand grasping. A normalized percentage of all the range of motion is used for synchronising all the fingers and thumb from 0% (maximum hand close position 95) to 100% (maximum hand open position 96). The software program automatically determines the range of motion for each finger or thumb. The range of motion 56 is determined by identifying the maximum hand open position 96 and the maximum hand close position 95 through the detection of the force feedback during the movement of the fingers in a resting stage. The closing and the opening threshold of the force feedback is used to identify the maximum hand open and close positions 96, 95, for example, a range from 1N to 50N. After the maximum positions are identified, the software synchronizes all the movements of the fingers and thumb from the maximum hand open position 96 to the maximum hand close position 95.

As different fingers of the user have different ranges of motion between the maximum finger extension and maximum finger flexion, the software uses the measured range of motion and a trial time to adjust the speed of each motor 12. Consequently each motor 12 has a different velocity to another so that the motion of all the fingers and thumb starts and finishes together at the same time. A typical trial time is about 3 to 10 seconds and it is the time for the stroke patient to exercise their hands from maximum close position 95 to maximum open position 96 and vice versa for performing daily activity tasks.

Referring to FIGS. 16 and 17, the measurement of the range of motion 56 of the motor 12 to move the fingers and thumb of a hand 57 is performed by an automatic hand calibration module. The measurement is initiated by setting 41 all motor positions to the middle point of the motor range. The motor range is the range between the maximum motor position 97 and the minimum motor position 98. The maximum motor position 97 and the minimum motor position 98 are determined by the movable range of the finger assembly 71. To measure the maximum hand close position 95, steps 42 to 46 are performed. To measure the maximum hand open position 96, steps 48 to 52 are performed.

To measure the maximum hand close position 95 and hand closing range, all motors are moved (42) towards the maximum motor position 97 for each finger (43). If the force feedback of a finger is greater than the closing threshold (44), the corresponding motor is stopped and the maximum hand close position 95 data is recorded (46). If the force feedback of a finger is less than the closing threshold, the corresponding motor continues to move (45) until it reaches the maximum motor position 97. If the corresponding motor reaches the maximum motor position 97, this position is recorded (46) as the maximum hand close position 95 for the corresponding finger data. The software waits until all motors stopped (47).

To measure the maximum hand open position 96 and hand opening range, after all motors are stopped (47), all motors move (48) towards the minimum motor position 98. If the force feedback of a finger is greater than the opening threshold (50), the corresponding motor is stopped and the maximum hand open position 96 data is recorded (52). If the force feedback of a finger is less than the opening threshold (50), the corresponding motor continues to move (51) until it reaches the minimum motor position 98. If the corresponding motor reaches the minimum motor position 98, this position is recorded (52) as the maximum hand open position 96 for the corresponding finger data. The software waits until all motors stopped (53). The range of motion of all fingers is calculated (54) and the result data is sent (55) to a motor control program. The functionality of the motor control program is depicted in FIG. 18.

Referring to FIG. 18, the process for controlling all the motors to start and finish at the same time by adaptively adjusting the speed by itself is provided by the motor control program. All range of motion data of the fingers of the hand is received (60) from the automatic hand calibration module depicted in FIG. 16. The trial time is obtained (61) from the user. Based on the trial time and the obtained range of motions for each finger, the initial opening speed (72) and closing speed (62) under load free condition are used to initialize all motors. In one example, the speed of the motors can be adjusted by the excitation voltage or different on/off pattern. Therefore, if there is no external force applied by the fingers of the user, all motors move in determined speed and complete the full range of motions with movement of all fingers start and stop at the same time. Subsequently, based on the user selection of the training action, all motors are activated (63, 73) and moved towards the hand closing direction 63 or the hand opening direction 73. This is performed for each finger and thumb (65, 75). When the motors reach (66, 76) the maximum hand close position 95 or the maximum hand open position 96, the motors stop and the required time for all motors to complete the motion is recorded (67, 77). The software waits until all motors are stopped (68, 78). As the hand condition of a stroke patient is affected by spasticity or contracture during training, the external force from the user's hand affects the force applied to the motors. The external force can increase or decrease the speed and therefore affect the completion time. This external force can also change during training, therefore the adaptive speed algorithm is required to be self-adjustable. If the time of completion of any motor is detected shorter than the trial time as pre-configured (69, 79), the speed for the corresponding motor is reduced (71, 81) for the next trial. If the time of completion of any motor is detected longer than the trial time as configured, the speed for the corresponding motor should be increased (70, 80) for the next training trial. In the next training trial, a new set of motor speeds is used to control all motors to try to start and finish at the same time for hand opening and closing functions.

Figure 19:
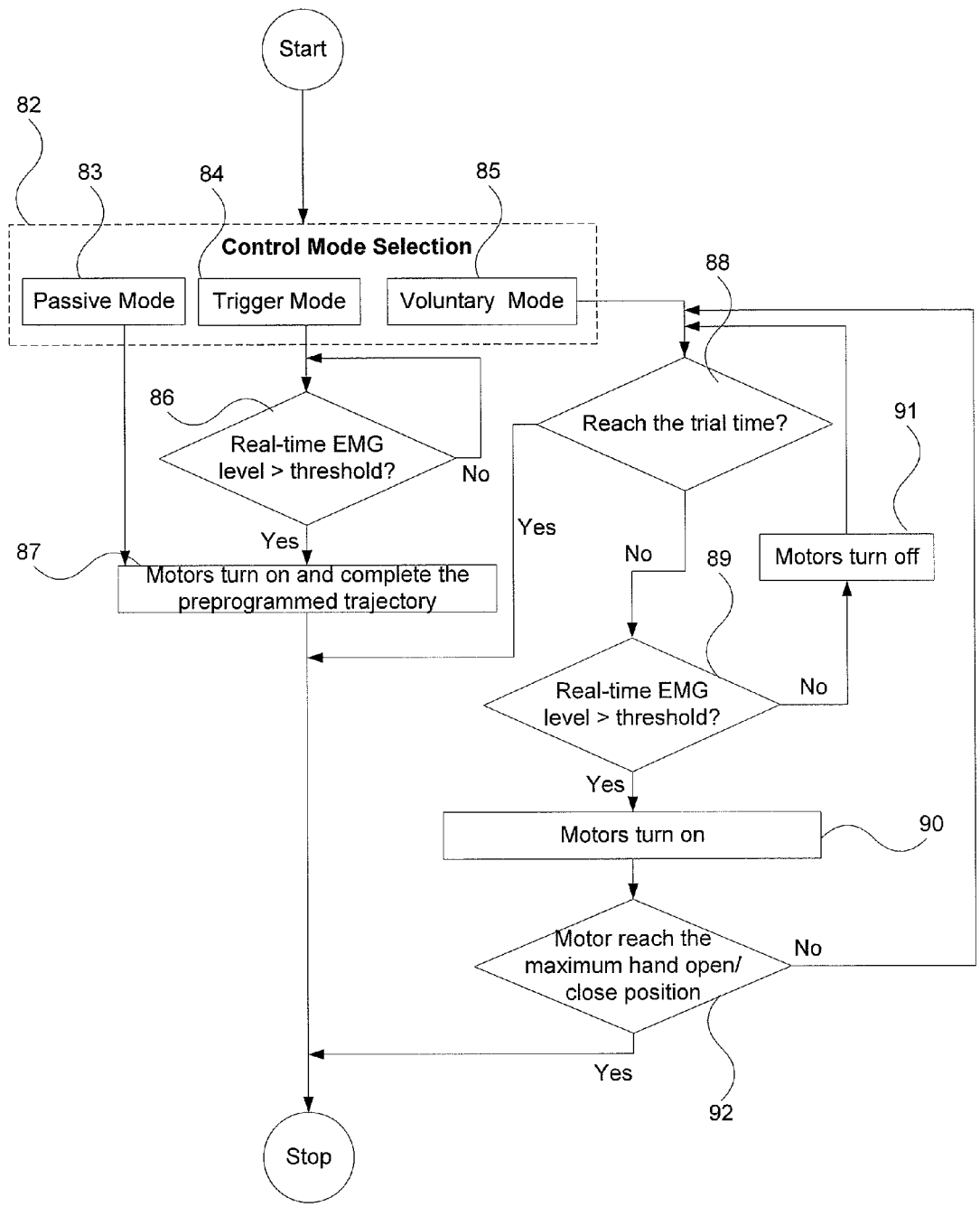
FIG. 19 is a process flow diagram for controlling the device of FIG. 1.

Referring to FIG. 19, the process for controlling the device 10 is illustrated. A control mode is selected (82) by the user. The available control modes are: passive mode (83), trigger mode (84) and voluntary mode (85). If passive mode (83) is selected, the motors are activated (87) and complete the preprogrammed trajectory without any inputs. If trigger mode (84) is selected, the detected real-time EMG level is compared (86) to a predetermined threshold. If the EMG level is greater than the threshold, then the motors are activated (87) and complete the preprogrammed trajectory. If voluntary mode (85) is selected, a trial time limit is monitored (88) to detect whether it has been reached. If the time limit has not been reached, the detected real-time EMG level is compared (89) to a predetermined threshold. If the EMG level is greater than the threshold, then the motors are activated (90). If the EMG level is less than the threshold, then the motors are deactivated (91). If the motors have been activated (90) but have not reached (92) the maximum hand open or close positions 95, 96 position, monitoring (88) of the trial time limit continues.

Figure 20:
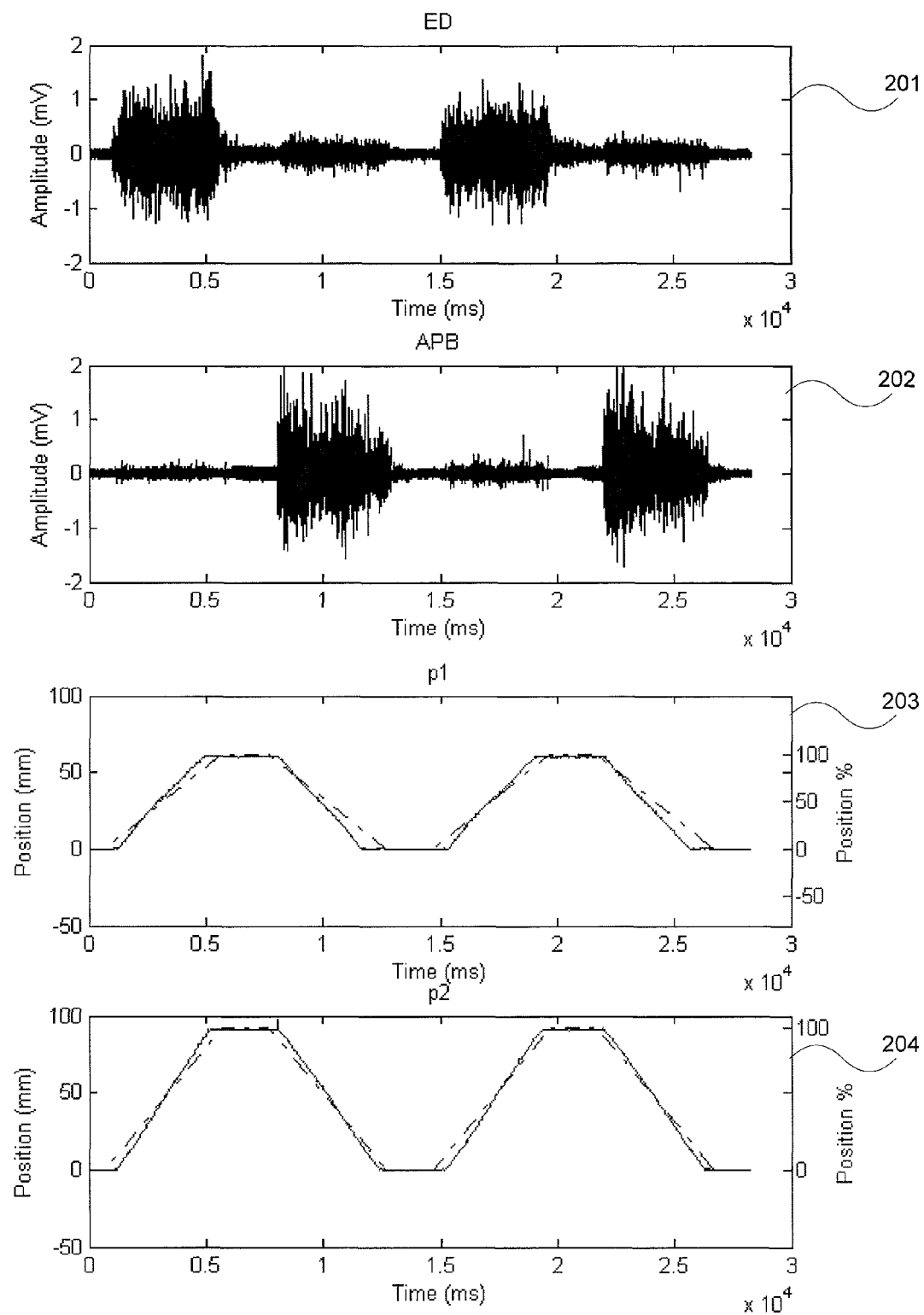
FIG. 20 is a set of charts showing recorded EMG signals from the ED and APB muscles and the positions of the thumb and the index finger when the device of FIG. 1 is in voluntary mode.

Referring to FIG. 20, a chart 201 showing the recording of EMG signals from the ED is depicted. Another chart 202 depicts the APB muscles during a voluntary mode tracking task. A third chart 203 depicts the position of the thumb p1 during a voluntary mode tracking task. A fourth chart 204 depicts position of the index finger p2 during a voluntary mode tracking task. The solid line in the third and fourth charts 203, 204 represents the actual position of the fingers. The dashed line represents the target position.

During the hand opening trial, if the detected EMG signals from the ED of the user is above the threshold, motors 89 are activated. If the detected EMG signals from the ED of the user is below the threshold, the motors are deactivated. During the hand closing trial, if the detected EMG signals from the APB of the user is above the threshold 89, the motors are activated. If the detected EMG signals from the APB of the user is below the threshold, motors are deactivated. The detected actual motor positions are recorded and illustrated as in the solid line in the charts. Comparison between the tracking data of the actual finger position (solid line) and the pre-programmed trajectory (dashed line) illustrates the user's performance of hand opening and hand closing functions.

Figure 21:
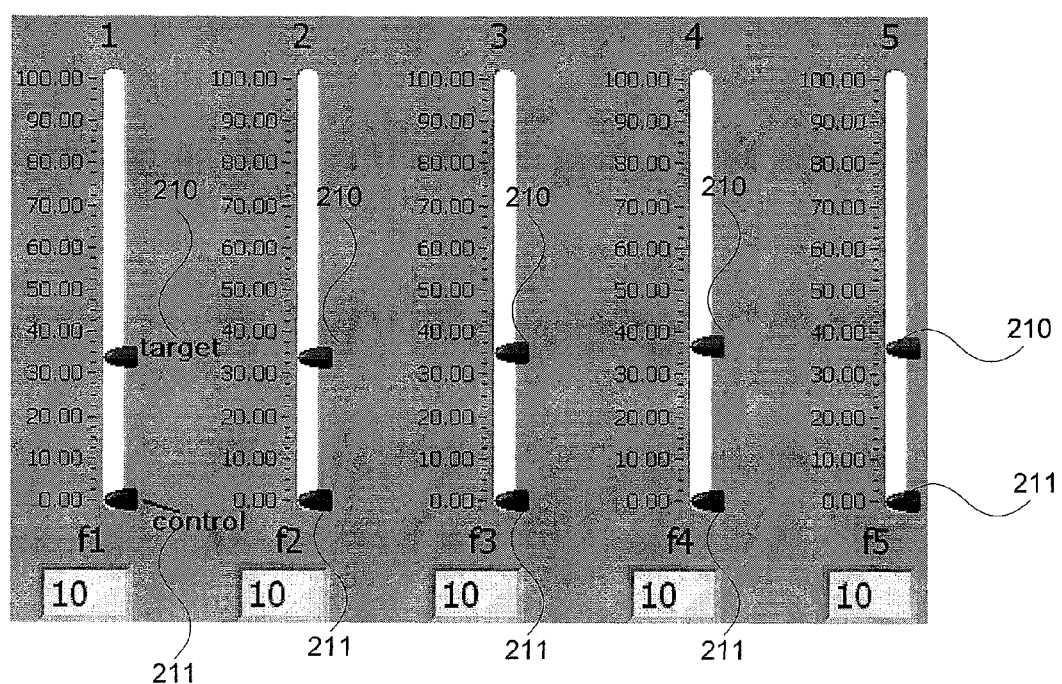
FIG. 21 is a screenshot from a training software program providing visual feedback to guide the user during different kinds of training tasks.

Referring to FIG. 21, training software provides visual feedback to guide the user during different kinds of training tasks. The software also actively trains the user and evaluates performance according to a training regime. A screenshot of the display of the position of each finger in a finger tracking task is illustrated. The target sliders 210 are moved from 0% to 100% for the range of motion of each finger in t seconds of the configured trial time 61. After waiting 3 seconds, for example, they are moved from 100% back to 0% also in t seconds of the configured trial time. The trial time t in seconds is an adjustable time value that can be set in the training software. When the target sliders 210 are moving, the fingers of a user should follow the movement of the target sliders 210 as close as possible. The position of the fingers of a user are represented by the position of control sliders 211 on the display.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A rehabilitation system for training hand movement of a user, the system comprising:
    a platform adapted to be attached to a hand of the user;
    a plurality of finger assemblies operatively connected to the platform, each finger assembly having:
        a motor,
        a proximal follower assembly for a metacarpophalangeal (MCP) joint having a proximal rail guide operatively connected to the motor, and
        an intermediate follower assembly for a proximal interphalangeal (PIP) joint having an intermediate rail guide operatively connected to the proximal follower assembly;
    wherein a first knuckle joint indicator of the proximal rail guide identifies a location of a first virtual center and a second knuckle joint indicator of the intermediate rail guide identifies a location of a second virtual center, an alignment of the knuckle joint indicators to the virtual centers enable motion of a finger of the hand to be controlled and maintain rotational axes of the finger about each virtual center when the proximal and intermediate follower assemblies are actuated by the motor.

2. The system according to claim 1, wherein the first virtual center is located at the MCP joint, and the second virtual center is located at the PIP joint.

3. The system according to claim 1, wherein there are five finger assemblies operatively connected to the platform via five finger assembly sockets provided on the platform.

4. The system according to claim 3, wherein each finger assembly comprises a proximal support cushion and an intermediate support cushion for holding a finger.

5. The system according to claim 4, wherein the finger assembly socket, intermediate rail guide, proximal and intermediate follower assemblies and proximal and intermediate support cushions are provided with a dovetailed groove system.

6. The system according to claim 5, wherein the intermediate follower assembly has an adjustable linkage, and an inner dovetail groove system is provided on the proximal follower assembly engaging the intermediate rail guide to enable alignment of the second knuckle joint indicator to the second virtual center.

7. The system according to claim 3, wherein the locations of the virtual centers are adjustable to accommodate different finger lengths, the first virtual center is adjusted by moving a position of the finger assembly in the finger assembly sockets to align the first knuckle joint indicator with a center of the MCP joint, the second virtual center is adjusted by moving an adjustable linkage to align the second knuckle joint indicator with a center of the PIP joint.

8. The system according to according to claim 5, wherein the proximal and intermediate support cushions each have a ring for receiving a finger therethrough, and a position of the rings are adjustable on a finger segment to align the MCP joint and the PIP joint to maintain rotational axes of the finger about the first and second virtual centers when the proximal and intermediate follower assemblies are actuated by the motor.

9. The system according to claim 8, wherein the rings are releasably detachable from the dovetailed groove system.

10. The system according to claim 1, further comprising a sensor attached to the finger assembly to measure a feedback force applied by a finger and curvature position of the finger.

11. The system according to claim 1, further comprising a hand calibration software module to automatically determine a range of motion during hand opening and hand grasp functions.

12. The system according to claim 1, further comprise a motor control software module to automatically adjust all motors speed such that an angle position of all fingers start and finish at the same time.

13. The system according to claim 1, further comprising a self adaptive motor speed adjustment module to automatically adjust a speed of each motor to accommodate a speed change, which due to an external force applied by the finger, during training in order to start and complete a full range of motion at a same time in a next finger motion.

14. The system according to claim 1, wherein the motor is a linear actuator.

15. A finger assembly for training hand movement of a user, the finger assembly being operatively connected to a platform, the finger assembly comprising:
    a motor;
    a proximal follower assembly for a metacarpophalangeal (MCP) joint having a proximal rail guide operatively connected to the motor; and
    an intermediate follower assembly for a proximal interphalangeal (PIP) joint having an intermediate rail guide operatively connected to the proximal follower assembly;
    wherein a knuckle joint indicator of the proximal rail guide identifies a location of a first virtual center and a knuckle joint indicator of the intermediate rail guide identifies a location of a second virtual center, an alignment of the knuckle joint indicators to the virtual centers enable motion of a finger of the hand to be controlled and maintain rotational axes of the finger about each virtual center when the proximal and intermediate follower assemblies are actuated by the motor.

16. The assembly according to claim 15, wherein the motor is a linear actuator.

* * * * *